June 13, 1961 F. X. RIJCKAERT 2,988,684
VIBRATOR MOTOR CIRCUIT ARRANGEMENT
Filed July 24, 1959
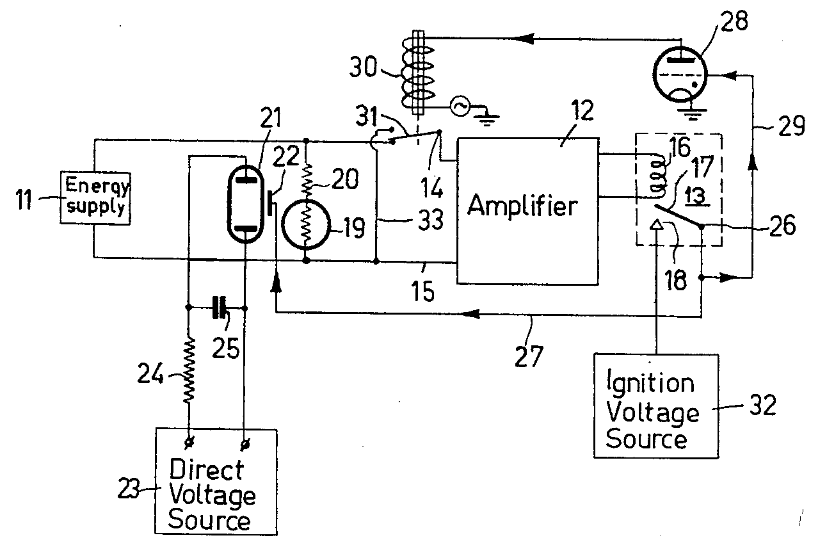
INVENTOR
FRANS XAVIER RIJCKAERT
BY
Frank R. Jeffari
AGENT 2,988,684

VIBRATOR MOTOR CIRCUIT ARRANGEMENT

Frans Xavier Rijckaert, Eindhoven, Netherlands, assignor to North American Philips Company, Inc., New York, N.Y., a corporation of Delaware Filed July 24, 1959, Ser. No. 829,356
Claims priority, application Netherlands Aug. 5, 1958
6 Claims. (Cl. 318—128)

The present invention relates to a vibrator circuit arrangement. More particularly, the invention relates to a vibrator circuit arrangement comprising means for substantially deenergizing the vibrator when the amplitude of vibration of the vibrator exceeds a desired maximum value.

Vibrator circuit arrangements of known type may be utilized to determine the structural strength of test members under vibration. Such circuit arrangements usually supply about 40 kilowatts power to the vibrator and the vibrator usually vibrates at a frequency in the range of 2 to 5000 cycles per second.

If the energy supplied to the vibrator remains substantially constant, the amplitude of vibration of the vibrator increases with decreasing frequency of vibration. Also, resonance may occur at given frequencies and increase the amplitude of vibration of the vibrator. It is thus necessary to protect the vibrator from excessive amplitudes of vibration. The protecting means must be fast-acting in order to be effective, so that mechanical relays, having a response time of about 5 milliseconds, are not practicable. A suitable response time, for making the protecting means effective, is 1 millisecond or less. Electronic relays are not practicable because they may produce pulses upon energization which may damage the vibrator.

The principal object of the present invention is the provision of a vibrator circuit arrangement comprising means for protecting the vibrator from excessive amplitudes of vibration.

An object of the present invention is the provision of a vibrator circuit arrangement comprising means for protecting the vibrator from excessive amplitudes of vibration rapidly and effectively.

Another object of the present invention is the provision of a vibrator circuit arrangement comprising relatively simple, but efficient, means for protecting the vibrator from excessive amplitudes of vibration.

In accordance with the present invention energy is supplied to a vibrator adapted to vibrate in a desired amplitude range. Photosensitive means are interposed between the energy supply source and the vibrator for substantially deenergizing the vibrator upon irradiation of the photosensitive means and means actuated by the vibrator at an amplitude of vibration of the vibrator exceeding a desired maximum value is provided for irradiating the photosensitive means. The irradiating means is preferably a gas discharge device which is ignited when the amplitude of vibration of the vibrator exceeds the desired maximum value.

In order that the invention may be readily carried into effect, it will now be described with reference to the accompanying drawing, wherein the single figure is a schematic diagram of an embodiment of the circuit arrangement of the present invention.

In the figure, means for supplying energy 11 may comprise, for example, an RC oscillator with a variable frequency. The energy supplying means 11 is connected through amplifier means 12 to a vibrator 13. The amplifier means 12 may comprise, for example, a high power amplifier and has a pair of input terminals 14 and 15 to which the energy supplied by the energy supplying means 11 is applied. The vibrator 13 comprises actuating means, such as, for example, an excitation coil 16, which is energized by the energy supplying means 11 through the amplifier means 12, and a vibrating element 17, which is vibrated under the influence of said actuating means. A contact 18 is positioned in the path of motion of the vibrating element 17 at a point beyond the desired maximum amplitude of vibration, so that when said vibrating element has an amplitude of vibration greater than said desired maximum amplitude, it contacts said contact.

Photosensitive means 19 is interposed between the energy supplying means 11 and the vibrator 13 for substantially preventing the supply of energy to said vibrator upon irradiation of said photosensitive means. The photosensitive means 19 may comprise, for example, a photosensitive or photoconductive element comprising calcium sulphide and is preferably connected in series circuit arrangement with a resistor 20. The series circuit arrangement of the photosensitive means 19 and the resistor 20 is connected across the input terminals 14, 15 of the amplifier means 12.

When the photosensitive means 19 is irradiated, its resistance decreases substantially to a point at which it substantially reduces the application of voltage to the input of the amplifier means 12 and thereby substantially reduces the supply of current to the vibrator actuating means 16 to substantially prevent further vibration of the vibrating element 17. A suitable choice of the material of the photosensitive element 19 and of the intensity of the irradiating light causes the resistance of the series circuit arrangement 19, 20 to decrease substantially instantaneously to a relatively low value and, upon cessation of the irradiation, to increase relatively slowly back to its initial value. The short circuit of the input terminals 14 and 15 of the amplifier means 12 by the series circuit arrangement 19, 20 is of a desired duration such as, for example, 5 milliseconds. When the photosensitive element 19 is not irradiated its resistance value is approximately 500 megohms and when it is irradiated its resistance value decreases to approximately 500 ohms. Thus, when the photosensitive element 19 is irradiated, the input voltage to the amplifier means 12 is substantially prevented and substantially deenergizes the vibrator 13.

Means for irradiating the photosensitive means 19 preferably comprises a gas discharge device 21 having an ignition electrode 22. The gas discharge device 21 is positioned in operative proximity to the photosensitive means 19 in a manner whereby ignition of said discharge device causes irradiation of said photosensitive means. The ignition electrode 22 may be provided inside or outside the envelope of the gas discharge device 21. The discharge device 21 is powered by a direct voltage source 23 which is connected to said discharge device through a resistor 24. A capacitor 25, which has a relatively high capacitance value is interposed between the direct voltage source 23 and the discharge device 21 and is connected in parallel across said source and said device. The capacitor 25 insures that a non-recurring discharge occurs when the discharge device 21 is ignited.

The vibration element 17 is electrically connected, at its pivot point 26, to the ignition electrode 22 of the discharge device 21 through a conductor 27 and to the ignition electrode of a gas discharge tube 28 through a conductor 29. The anode of the gas discharge tube 28 is connected to the energization winding 30 of a relay which further comprises an armature member 31. The armature 31 normally connects the input terminal 14 of amplifier 12 to the oscillator 11 when relay 30 is deenergized and connects input terminal 14 to terminal 15 thereby short-circuiting the input of amplifier 12 when the relay winding 30 is energized.

The contact 18 is connected to a source of voltage 32 of sufficient magnitude to ignite the discharge device 21 and the discharge tube 28. When the amplitude of vibration of the vibrating element 17 exceeds the desired maximum value, the free end of said vibrating element makes physical and electrical contact with the contact 18. When the vibrating element 17 electrically connects the contact 18 with the pivot point 26, due to the amplitude of vibration of said vibrating element exceeding the desired maximum value, an ignition voltage is applied from the source 32 to the ignition electrode 22 of the gas discharge device 21. When the discharge device 21 is ignited, it irradiates the photosensitive means 19 and causes the resistance of said photosensitive means to decrease substantially to a point at which it substantially reduces the application of voltage to the input of the amplifier means 2 and substantially prevents further vibration of the vibrating element 17. The resistance of the photosensitive means 19 remains at its new low value for approximately 5 milliseconds thereby permitting operation of the relay before said resistance returns to its initial value.

When the vibrating element 17 electrically connects the contact 18 with the pivot point 26, due to the amplitude of vibration of said vibrating element exceeding the desired maximum value, an ignition voltage is applied from the source 32 to the ignition electrode of the gas discharge tube 28. When the gas discharge tube 28 is ignited, it energizes the excitation winding 30 of the relay and thereby causes the circuit to be opened by the relay armature 31. The armature 31 may, at the same time that it opens the circuit between the energy supplying means 11 and the vibrator 13, short circuit the input of the amplifier means 12 by connecting the input terminals 14 and 15 of said amplifier means through a conductor 33. Thus, in the event that the photoconductor 19 fails to act, the mechanical relay 30 serves as an added safety precaution short-circuiting the input of amplifier 12. Furthermore, because of the delayed action of the mechanical relay due to its relatively slow response period, the interval during which the input of amplifier 12 is short-circuited is greatly extended without the necessity for increasing the length of the recovery time of the photoconductor 19.

While the invention has been described by means of a specific example and in a specific embodiment, I do not wish to be limited thereto, for obvious modifications will occur to those skilled in the art without departing from the spirit and scope of the invention.

What I claim is:

1. A circuit arrangement comprising a vibrator adapted to vibrate in a desired amplitude range, means for supplying energy to said vibrator, photosensitive means interposed between said energy supplying means and said vibrator for substantially deenergizing the said vibrator upon irradiation of said photosensitive means, means for irradiating said photosensitive means, and means actuated by said vibrator at an amplitude of vibration of the said vibrator exceeding the maximum value of said desired amplitude range for energizing said irradiating means.

2. A circuit arrangement comprising a vibrator adapted to vibrate in a desired amplitude range, means for supplying energy to said vibrator, photosensitive means interposed between said energy supplying means and said vibrator for substantially deenergizing the said vibrator upon irradiation of said photosensitive means, a gas discharge device having an ignition electrode and positioned in operative proximity to said photosensitive means in a manner whereby ignition of said discharge device causes irradiation of the said photosensitive means, and means actuated by said vibrator at an amplitude of vibration of the said vibrator exceeding the maximum value of said desired amplitude range for applying an ignition voltage to said ignition electrode.

3. A circuit arrangement comprising a vibrator adapted to vibrate in a desired amplitude range, means for supplying energy to said vibrator, photosensitive means interposed between said energy supplying means and said vibrator for substantially deenergizing the said vibrator upon irradiation of said photosensitive means, means interposed between said energy supplying means and said vibrator for opening said circuit arrangement, a gas discharge device having an ignition electrode and positioned in operative proximity to said photosensitive means in a manner whereby ignition of said discharge device causes irradiation of the said photosensitive means, means actuated by said vibrator at an amplitude of vibration of the said vibrator exceeding the maximum value of said desired amplitude range for applying an ignition voltage to said ignition electrode, and means actuated by said vibrator at an amplitude of vibration of the said vibrator exceeding the maximum value of said desired amplitude range for actuating said circuit opening means to open said circuit arrangement.

4. A circuit arrangement comprising a vibrator adapted to vibrate in a desired amplitude range, amplifier means having a pair of input terminals, means for supplying energy to said vibrator through said amplifier means, photosensitive means interposed between said energy supplying means and said amplifier means for substantially deenergizing the said vibrator upon irradiation of said photosensitive means, said photosensitive means being connected across said input terminals of said amplifier means, a gas discharge device having an ignition electrode and positioned in operative proximity to said photosensitive means in a manner whereby ignition of said discharge device causes irradiation of the said photosensitive means, and means actuated by said vibrator at an amplitude of vibration of the said vibrator exceeding the maximum value of said desired amplitude range for applying an ignition voltage to said ignition electrode.

5. A circuit arrangement comprising a vibrator adapted to vibrate in a desired amplitude range, means for supplying energy to said vibrator, photosensitive means interposed between said energy supplying means and said vibrator for substantially deenergizing the said vibrator upon irradiation of said photosensitive means, a gas discharge device having an ignition electrode and positioned in operative proximity to said photosensitive means in a manner whereby ignition of said discharge device causes irradiation of the said photosensitive means, means for supplying power to said discharge device, a resistor connected in series between said power supply and said discharge device, a capacitor having a relatively high capacitance value interposed between said power supply and said discharge device and connected in parallel with the said discharge device, and means actuated by said vibrator at an amplitude of vibration of the said vibrator exceeding the maximum value of said desired amplitude range for applying an ignition voltage to said ignition electrode.

6. A circuit arrangement comprising a vibrator adapted to vibrate in a desired amplitude range, amplifier means having a pair of input terminals, means for supplying energy to said vibrator through said amplifier means, photosensitive means interposed between said energy supplying means and said vibrator for substantially deenergizing the said vibrator upon irradiation of said photosensitive means, said photosensitive means being connected across said input terminals of said amplifier means and comprising a material which decreases substantially in resistive value when irradiated and increases to its initial resistive value a predetermined time after the cessation of irradiation thereof, a gas discharge device having an ignition electrode and positioned in operative proximity to said photosensitive means in a manner whereby ignition of said discharge device causes irradiation of the said photosensitive means, and means actuated by said vibrator at an amplitude of vibration of the said vibrator exceeding the maximum value of said desired amplitude range for applying an ignition voltage to said ignition electrode.

No references cited.